United States Patent
Adachi et al.

(10) Patent No.: US 9,294,658 B2
(45) Date of Patent: *Mar. 22, 2016

(54) LENS BARREL, IMAGING DEVICE AND CAMERA

(75) Inventors: Yusuke Adachi, Osaka (JP); Norikazu Katsuyama, Osaka (JP); Fumio Muramatsu, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 239 days.

This patent is subject to a terminal disclaimer.

(21) Appl. No.: 13/696,990

(22) PCT Filed: Jul. 28, 2011

(86) PCT No.: PCT/JP2011/004292
§ 371 (c)(1),
(2), (4) Date: Nov. 8, 2012

(87) PCT Pub. No.: WO2012/077257
PCT Pub. Date: Jun. 14, 2012

(65) Prior Publication Data
US 2013/0050568 A1 Feb. 28, 2013

(30) Foreign Application Priority Data
Dec. 6, 2010 (JP) ................................ 2010-271051

(51) Int. Cl.
G03B 17/00 (2006.01)
H04N 5/225 (2006.01)
G03B 3/10 (2006.01)
G02B 7/10 (2006.01)

(52) U.S. Cl.
CPC .............. *H04N 5/2254* (2013.01); *G02B 7/102* (2013.01); *G03B 3/10* (2013.01); *G03B 2205/0046* (2013.01)

(58) Field of Classification Search
USPC ................................ 396/87, 133, 97; 359/698
See application file for complete search history.

(56) References Cited

U.S. PATENT DOCUMENTS

| 5,212,598 A | 5/1993 | Kikuchi | |
| 5,455,649 A * | 10/1995 | Yamada et al. | ................. 396/87 |
| 5,708,870 A * | 1/1998 | Sugita et al. | .................... 396/87 |
| 6,970,647 B2 * | 11/2005 | Nakamura | ............... G05B 5/32 |
| | | | 348/348 |

(Continued)

FOREIGN PATENT DOCUMENTS

| JP | H4-040405 A | 2/1992 |
| JP | H4-172410 A | 6/1992 |

(Continued)

OTHER PUBLICATIONS

International Search Report of PCT Application No. PCT/JP2011/004292, Mail Date: Aug. 30, 2011.

(Continued)

*Primary Examiner* — Clayton E Laballe
*Assistant Examiner* — Warren K Fenwick
(74) *Attorney, Agent, or Firm* — Shinjyu Global IP

(57) ABSTRACT

A lens barrel includes a first zoom/focus lens group and a second zoom/focus lens group configured to respectively vary a focal distance and imaging distance by moving in an optical axis, a first actuator configured to drive the first zoom/focus lens group, and a second actuator configured to drive the second zoom/focus lens group.

14 Claims, 11 Drawing Sheets

(56) References Cited

U.S. PATENT DOCUMENTS

| | | | |
|---|---|---|---|
| 6,993,256 B2 * | 1/2006 | Ogg et al. | 396/81 |
| 7,006,139 B2 | 2/2006 | Ohkawara | |
| 7,095,566 B2 | 8/2006 | Suzuki et al. | |
| 7,574,126 B2 * | 8/2009 | Honjo et al. | 396/97 |
| 7,782,548 B2 | 8/2010 | Yumiki et al. | |
| 8,988,594 B2 * | 3/2015 | Katsuyama | G02B 7/102 348/240.3 |
| 2003/0030742 A1 | 2/2003 | Ike | |
| 2009/0251779 A1 | 10/2009 | Adachi et al. | |
| 2009/0251780 A1 | 10/2009 | Adachi et al. | |
| 2009/0251781 A1 | 10/2009 | Adachi et al. | |
| 2009/0273703 A1 | 11/2009 | Kawauchi | |
| 2011/0122516 A1 * | 5/2011 | Jang | 359/823 |
| 2012/0082444 A1 * | 4/2012 | Yumiki et al. | 396/125 |
| 2013/0050568 A1 | 2/2013 | Adachi et al. | |

FOREIGN PATENT DOCUMENTS

| | | |
|---|---|---|
| JP | H04-256911 A | 9/1992 |
| JP | H5-107451 A | 4/1993 |
| JP | H8-043718 A | 2/1996 |
| JP | H8-136793 A | 5/1996 |
| JP | H11-023944 A | 1/1999 |
| JP | 2000-275504 A | 10/2000 |
| JP | 2004-145308 A | 5/2004 |
| JP | 2004-317867 A | 11/2004 |
| JP | 2009-86680 A | 4/2009 |
| JP | 2009086680 A * | 4/2009 |
| JP | 2010-079250 A | 4/2010 |

OTHER PUBLICATIONS

International Search Report of co-pending PCT Application No. PCT/JP2011/004293, Mail Date: Aug. 30, 2011.

The Office Action for co-pending U.S. Appl. No. 13/696,992, issued Apr. 24, 2014.

The Notice of Allowance for co-pending U.S. Appl. No. 13/696,992, issued on Jan. 9, 2015.

An Office Action for corresponding Japanese Patent Application No. 2012-547674 issued on Feb. 24, 2015.

The Office Action from the related Japanese Patent Application No. 2012-548609 issued on Oct. 6,2015.

The Office Action from the corresponding Japanese Patent Application No. 2012-547674 issued on Nov. 4,2015.

* cited by examiner

LENS BARREL, IMAGING DEVICE AND CAMERA

TECHNICAL FIELD

The technology disclosed herein relates to a camera capable of capturing still or moving pictures, and to an imaging device and a lens barrel used in this camera.

BACKGROUND ART

An imaging device capable of capturing still or moving pictures generally performs focusing and zooming operations by means of a focus actuator that drives one focus lens group, and a zoom actuator that drives one zoom lens group. A DC motor, a stepping motor, an ultrasonic motor, or the like is used for the focus actuator and the zoom actuator. The relative positions of the focus actuator and the zoom actuator can be ascertained with an encoder or the like, but the absolute positions are unknown, so a home point detecting sensor is used.

Japanese Laid-Open Patent Application 2010-79250 refers to an imaging device and a lens barrel capable of capturing still or moving pictures, wherein a zoom lens group is driven manually, and a focus lens group is driven by one actuator. The home point detecting sensor for the actuator is disposed in the center within the tracking range of the focus lens group.

SUMMARY

Technical Problem

However, since only one actuator was used in Japanese Laid-Open Patent Application 2010-79250, a problem was that the lens barrel ended up being larger.

It is an object of the present invention to provide a lens barrel, imaging device and camera that can be made smaller.

Solution to Problem

A lens barrel includes a first zoom/focus lens group and a second zoom/focus lens group configured to respectively vary a focal distance and imaging distance by moving in an optical axis, a first actuator configured to drive the first zoom/focus lens group, and a second actuator configured to drive the second zoom/focus lens group.

Advantageous Effects

With the present invention, hysteresis is eliminated during lens drive in focusing and zooming after initial lens operation when the power is turned on or when the lens is mounted, and since there is no need to remove any hysteresis, focusing and zooming can be performed at higher speed.

DESCRIPTION OF EMBODIMENTS

The lens barrel, imaging device and camera pertaining to embodiments of the present invention will be described. The following embodiments are just examples of embodiments of the present invention, and the present invention is not limited to or by these embodiments. Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Embodiments

1: Configuration of Digital Camera

Figure 1:
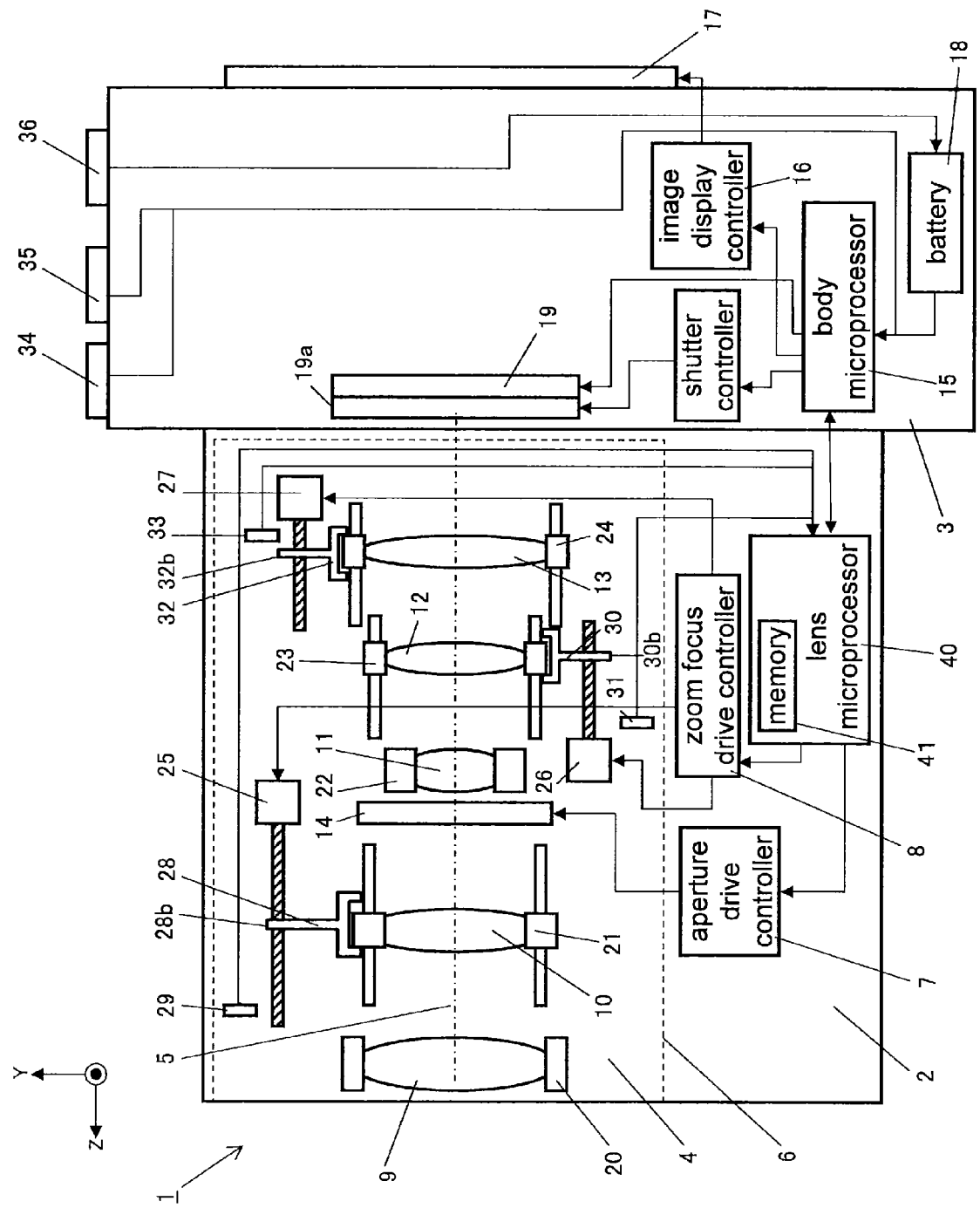
FIG. 1 is a simplified cross section of a digital camera.
Figure 2:
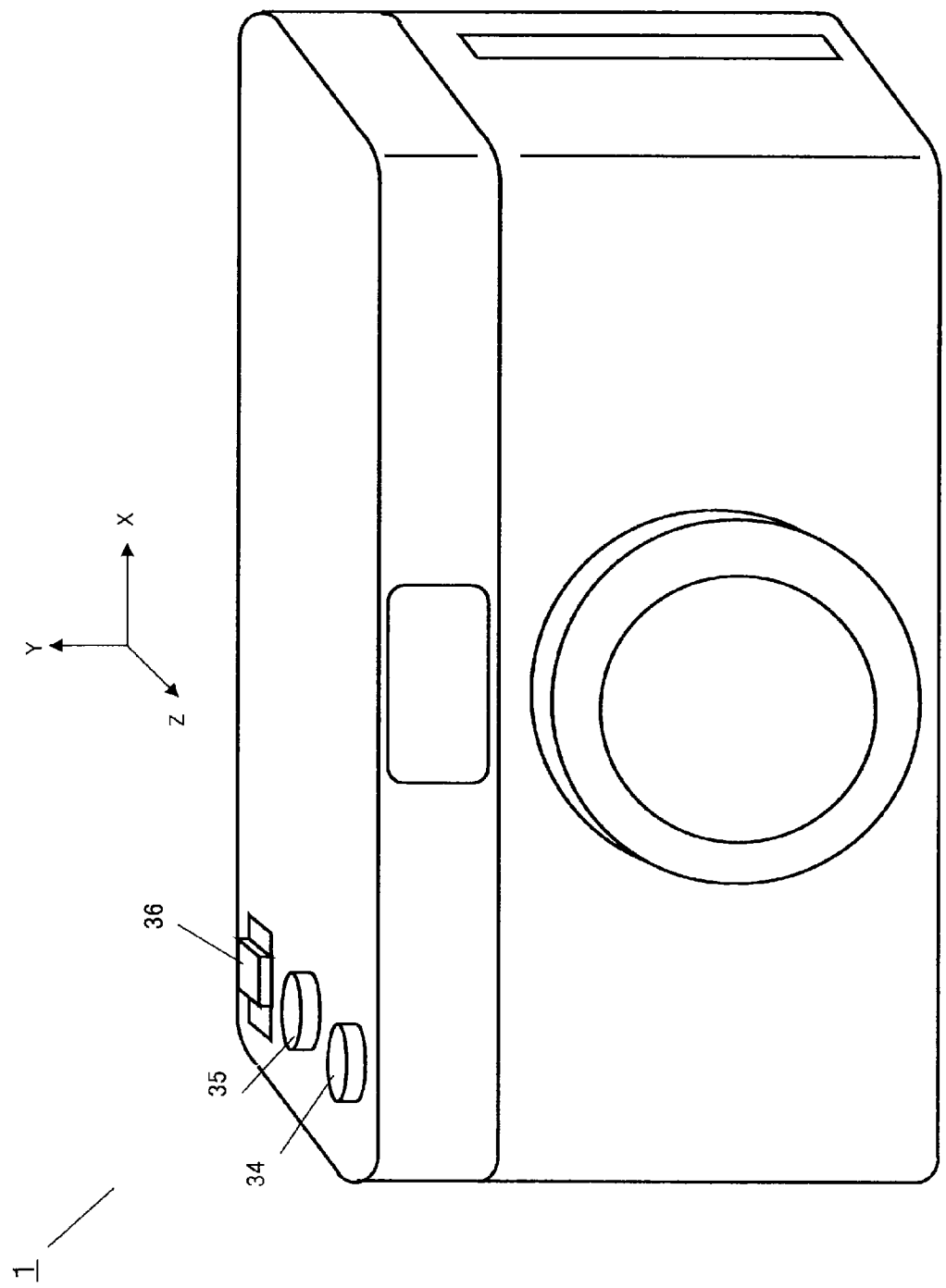
FIG. 2 is an oblique view of a digital camera.

FIG. 1 is a simplified cross section of a digital camera 1. FIG. 2 is an oblique view of the digital camera 1. As shown in FIG. 1, the digital camera 1 comprises a lens barrel 2 and a camera body 3.

As shown in FIGS. 1 and 2, in this embodiment, a three-dimensional perpendicular coordinate system is set up for the digital camera 1. The optical axis 5 of an optical system 4 (discussed below) coincides with the Z axis direction. The X axis direction coincides with the horizontal direction in the landscape orientation of the digital camera 1. The Y axis direction coincides with the vertical direction in the landscape orientation of the digital camera 1. These directions are not intended to limit the usage state of the digital camera 1.

As shown in FIG. 1, the lens barrel 2 has a lens support mechanism 6, an aperture drive controller 7, a zoom focus drive controller 8, and a lens microprocessor 40.

The lens support mechanism 6 has the optical system 4, lens support frames 20 to 24, zoom focus motors 25 to 27, and lens group photosensors 29, 31, and 33.

The camera body 3 has a body microprocessor 15, an image display controller 16, an image display component 17, a battery 18, and an imaging sensor 19.

The lens microprocessor 40 is connected with the body microprocessor 15 via an interface, and performs communication with the body microprocessor 15.

(1) Optical System

The optical system 4 has a first lens group 9, a second lens group 10, a third lens group 11, a fourth lens group 12, a fifth lens group 13, and an aperture mechanism 14. Of these lens groups, the second lens group 10, the fourth lens group 12, and the fifth lens group 13 are each an example of a zoom focus lens group that adjusts the focal state of a subject image and varies the zoom ratio through movement along the optical axis. More specifically, the fourth lens group 12 is an example of a "first zoom focus lens group," the second lens group 10 is an example of a "second zoom focus lens group," and the fifth lens group 13 is an example of a "third zoom focus lens group."

The second lens group 10, the fourth lens group 12, and the fifth lens group 13, which are zoom focus lens groups, each vary the focal distance and imaging distance (object imaging distance) by moving in the Z axis direction along the optical axis 5.

(2) Lens Support Mechanism

The lens support mechanism 6 is used to support the aperture mechanism 14 and the various lens groups 9 to 13 of the optical system 4, either movably or fixed. The lens support mechanism 6 has a fixing frame (not shown), a first lens group support frame 20, a second lens group support frame 21, a third lens group support frame 22, a fourth lens group support frame 23, and a fifth lens group support frame 24.

The fixing frame (not shown) supports the first lens group support frame 20, the aperture mechanism 14, the second lens group zoom focus motor 25, the third lens group support frame 22, the fourth lens group zoom focus motor 26, and the fifth lens group zoom focus motor 27, and also supports six guide poles extending in the Z axis direction. The second lens group zoom focus motor 25, the fourth lens group zoom focus motor 26, and the fifth lens group zoom focus motor 27 are stepping motors, for example.

In this embodiment, the fourth lens group zoom focus motor 26 is an example of a "first zoom focus motor," the second lens group zoom focus motor 25 is an example of a "second zoom focus motor," and the fifth lens group zoom focus motor 27 is an example of a "third zoom focus motor."

The first lens group support frame 20 supports the first lens group 9.

The second lens group support frame 21 supports the second lens group 10, and has a second lens group rack 28 and a second lens group rack protrusion 28b. The second lens group support frame 21 is supported movably in the Z axis direction in a state in which a guide pole is inserted into the second lens group support frame 21 so that rotation is impossible. The second lens group rack protrusion 28b is a portion used to detect the home point of the second lens group 10, and is provided at a position that can pass through the detection region of the second lens group photosensor 29.

The second lens group zoom focus motor 25 is fixed to the fixing frame (not shown), and drives the second lens group support frame 21 in the Z axis direction. A lead screw of the second lens group zoom focus motor 25 rotates on the basis of a drive signal inputted from the zoom focus drive controller 8. The rotational motion generated by the second lens group zoom focus motor 25 is converted by the lead screw and the second lens group rack 28 into rectilinear motion of the second lens group support frame 21 in the Z axis direction. This allows the second lens group support frame 21 to move in the Z axis direction.

The third lens group support frame 22 supports the third lens group 11.

The fourth lens group support frame 23 supports the fourth lens group 12, and has a fourth lens group rack 30 and a fourth lens group rack protrusion 30b. The fourth lens group support frame 23 is supported movably in the Z axis direction in a state in which a guide pole is inserted into the fourth lens group support frame 23 so that rotation is impossible. The fourth lens group rack protrusion 30b is a portion used to detect the home point of the fourth lens group 12, and is provided at a position that can pass through the detection region of the fourth lens group photosensor 31.

The fourth lens group zoom focus motor 26 is fixed to the fixing frame (not shown), and drives the fourth lens group support frame 23 in the Z axis direction. A lead screw of the fourth lens group zoom focus motor 26 rotates on the basis of a drive signal inputted from the zoom focus drive controller 8. The rotational motion generated by the fourth lens group zoom focus motor 26 is converted by the lead screw and the fourth lens group rack 30 into rectilinear motion of the fourth lens group support frame 23 in the Z axis direction. This allows the fourth lens group support frame 23 to move in the Z axis direction.

The fifth lens group support frame 24 supports the fifth lens group 13, and has a fifth lens group rack 32 and a fifth lens group rack protrusion 32b. The fifth lens group support frame 24 is supported movably in the Z axis direction in a state in which a guide pole is inserted into the fifth lens group support frame 24 so that rotation is impossible. The fifth lens group rack protrusion 32b is a portion used to detect the home point of the fifth lens group 13, and is provided at a position that can pass through the detection region of the fifth lens group photosensor 33.

The fifth lens group zoom focus motor 27 is fixed to the fixing frame (not shown), and drives the fifth lens group support frame 24 in the Z axis direction. A lead screw of the fifth lens group zoom focus motor 27 rotates on the basis of a drive signal inputted from the zoom focus drive controller 8. The rotational motion generated by the fifth lens group zoom focus motor 27 is converted by the lead screw and the fifth lens group rack 32 into rectilinear motion of the fifth lens group support frame 24 in the Z axis direction. This allows the fifth lens group support frame 24 to move in the Z axis direction.

The fourth lens group photosensor 31 is an example of a "first home point detector," the second lens group photosensor 29 is an example of a "second home point detector," and the fifth lens group photosensor 33 is an example of a "third home point detector."

(3) Zoom Focus Drive Controller

The zoom focus drive controller 8 is able to control all three of the zoom focus motors 25, 26, and 27 simultaneously, at the same or different drive speeds. Furthermore, the zoom focus drive controller 8 is able to drive just one or two of the three zoom focus motors 25, 26, and 27. When the zoom focus lens groups 10, 12, and 13 are driven to their focal positions, for example, high-speed auto-focusing can be accomplished by simultaneously driving the three zoom focus motors 25, 26, and 27.

Also, the zoom focus drive controller 8 drives just one of the zoom focus lens groups 10, 12, 13, such as the fifth lens group 13, which is the lightest of the zoom focus lens groups, during what is known as wobbling, in which the imaging distance is moved back and forth within a tiny range in order to confirm the focal position in moving picture capture, etc. Consequently, the zoom ratio can be varied and drive noise and power consumption can be reduced. More specifically, the zoom focus drive controller 8 controls the fifth lens group zoom focus motor 27 so that just the fifth lens group 13 is driven back and forth in the direction of the optical axis 5 during wobbling.

The lens microprocessor 40 is a control device serving as the functional center of the lens barrel 2. The lens microprocessor 40 is connected to the various components installed in the lens barrel 2, and controls the various sequences of the lens barrel 2. A CPU, a memory 41, etc., are installed in the lens microprocessor 40, and the CPU reads the programs stored in the memory 41, which allows the lens microprocessor 40 to carry out its various functions.

The zoom focus drive controller 8 is controlled by the lens microprocessor 40. Information (lens information) related to the lens barrel 2, position information about the zoom focus lens groups corresponding to subject distance, and so forth are stored in the memory 41 installed in the lens microprocessor 40.

The memory 41 is a nonvolatile memory, for example, and can hold recorded information even when the power supply has been shut off.

The lens microprocessor 40 instructs the zoom focus drive controller 8 to control the zoom focus motors 25, 26, and 27 on the basis of position information about the zoom focus lens groups corresponding to the subject distance. Consequently, the various zoom focus lens groups are driven in the Z axis direction. The lens microprocessor 40 is able to ascertain the positions of the zoom focus lens groups 10, 12, and 13 in the direction of the optical axis 5. That is, the lens microprocessor 40 is able to ascertain the subject distance. The subject distance is the distance to a subject for which an optical image has been formed by the optical system 4. More specifically, the lens microprocessor 40 confirms that the second lens group support frame 21 is at its home position from the detection signal of the second lens group photosensor 29, after which the position of the second lens group 10 in the direction of the optical axis 5 is ascertained by measuring the drive amount (such as the number of steps) of the second lens group zoom focus motor 25. Also, the lens microprocessor 40 confirms that the fourth lens group support frame 23 is in its home position from the detection signal of the fourth lens group photosensor 31, after which the position of the fourth lens group 12 in the direction of the optical axis 5 is ascertained by measuring the drive amount (such as the number of steps) of the fourth lens group zoom focus motor 26. Also, the lens microprocessor 40 confirms that the fifth lens group support frame 24 is in its home position from the detection signal of the fifth lens group photosensor 33, after which the position of the fifth lens group 13 in the direction of the optical axis 5 is ascertained by measuring the drive amount (such as the number of steps) of the fifth lens group zoom focus motor 27.

Also, the lens microprocessor 40 is able to receive signals from a power switch 35, a shutter button 34, and a zoom lever 36.

(4) Aperture Mechanism

The aperture mechanism 14 is controlled by the aperture drive controller 7. The opening shape of the aperture mechanism 14 is changed by driving aperture vanes (not shown) in the opening and closing directions. The aperture value of the optical system 4 can be varied by driving the aperture vanes. The aperture drive controller 7 varies the aperture diameter according to the imaging distance.

(5) Camera Body

The display component 17 is provided to the rear face of the camera body 3, and the shutter button 34, the power switch 35, and the zoom lever 36 are provided to the upper face of the camera body 3.

The power switch 35 is used to switch on and off the power to the digital camera 1. When the power is switched on with the power switch 35, power is supplied to the various components of the camera body 3 and the lens barrel 2.

A mode dial (not shown) is used to switch between still picture imaging mode, moving picture imaging mode, reproduction mode, and other such operating modes. The user turns the mode dial to switch the operating mode. When the mode dial is used to select still picture imaging mode, the operating mode is switched to still picture imaging mode, and when the mode dial is used to select moving picture imaging mode, the operating mode is switched to moving picture imaging mode. In moving picture imaging mode, basically, moving picture imaging is possible. Further, when the mode dial is used to select reproduction mode, the operating mode is switched to reproduction mode, and the captured image is displayed on the display component 17.

The shutter button 34 is operated by the user in capturing an image. When the shutter button 34 is pressed, a signal is outputted to the body microprocessor 15. The shutter button 34 is a two-position switch that can be pressed halfway or all the way down. When the user presses the shutter button 34 halfway down, processing for light metering and ranging begins. When the user presses the shutter button 34 all the way down in a state in which the shutter button 34 had been pressed halfway down, a timing signal is outputted, and image data is acquired by the imaging sensor 19.

The zoom lever 36 is operated by the user in capturing an image. When the zoom lever 36 is operated, the amount of its operation is outputted to the body microprocessor 15. The body microprocessor 15 outputs a command to the zoom focus drive controller 8 according to this operation amount, and controls the lens groups 10, 12, and 13 so that they move to the desired zoom positions.

(6) Imaging Sensor

The imaging sensor 19 is, for example, a CCD (charge coupled device) sensor that converts an optical image formed by the optical system 4 into an electrical signal. Drive of the imaging sensor 19 is controlled by a timing signal. The imaging sensor 19 may also be a CMOS (complementary metal-oxide semiconductor) sensor.

A shutter controller (not shown) actuates a shutter unit 19a (not shown) according to the control signal outputted from the body microprocessor 15 upon receipt of a timing signal.

In this embodiment, contrast detection, which makes use of image data produced by the imaging sensor 19, is employed as the auto-focusing method. Using contrast detection affords very precise focal adjustment.

(7) Body Microprocessor

The body microprocessor 15 is a control device serving as the functional center of the camera body 3, and controls the various components of the digital camera 1 according to inputted information. More specifically, a CPU, ROM, and RAM are installed in the body microprocessor 15, and the CPU reads the programs stored in the ROM, which allows the body microprocessor 15 to carry out its various functions. Also, the body microprocessor 15 can confirm that the second lens group support frame 21 is in its home position from the detection signal of the second lens group photosensor 29.

(8) Image Display Component

The image display component consists of the display component 17 and the image display controller 16. The display component 17 is a liquid crystal monitor, for example. The display component 17 displays a captured image on the basis of a command from the image display controller 16. Possible display modes with the display component 17 include a display mode in which just an image signal is displayed as a visible image, and a display mode in which an image signal and information about the date and time of capture are displayed as visible images.

(9) Battery

The battery 18 supplies power to the various components of the camera body 3, and supplies power to the lens barrel 2. In this embodiment, the battery 18 is a rechargeable battery. The battery 18 may be a dry cell, or may be an external power supply with which the supply of power is carried out from the outside with a power cord.

2: Operation of Digital Camera

The operation of the digital camera 1 will now be described.

(1) Still Picture Imaging

When the user presses the shutter button 34 all the way down, the aperture drive controller 7 is controlled by the lens microprocessor 40 so that the aperture value of the optical system 4 is set to the aperture value calculated on the basis of the light metering output of the imaging sensor 19. Consequently, the aperture mechanism 14 is stopped down to the indicated aperture value. Simultaneously with the aperture value indication, the body microprocessor 15 sends a command to drive the imaging sensor 19, and a command to drive the shutter unit 19a. As a result, imaging sensor 19 is exposed by the shutter unit 19a for the length of time of the shutter speed calculated on the basis of the light metering output from the imaging sensor 19.

After image capture processing has been executed, the body microprocessor 15 records an image signal to an internal memory and/or a removable memory. The body microprocessor 15 also records imaging mode information (whether auto-focus imaging mode or manual focus imaging mode) along with an image signal to an internal memory and/or a removable memory.

Upon completion of the exposure, the body microprocessor 15 reads the image data from the imaging sensor 19, and image data is outputted to the image display controller 16. Consequently, a captured image is displayed on the display component 17.

Also, upon completion of exposure, the shutter unit 19a is reset to its initial position by the body microprocessor 15. Also, a command is issued from the lens microprocessor 40 to the aperture drive controller 7 so that the aperture mechanism 14 will be reset to its open position, and reset commands are issued by the lens microprocessor 40 to the various units. Upon completion of the resetting, the lens body microprocessor 15 confirms that the shutter button 34 has not been pressed, and the imaging sequence is ended, after the receipt of reset completion information and after the completion of the series of processing following exposure.

(2) Moving Picture Imaging

The digital camera 1 also has the function of capturing moving pictures. In moving picture imaging mode, image data is produced by imaging sensor 19 at a specific period, and the image data thus produced is utilized to continuously carry out auto-focusing by contrast detection method. In moving picture imaging mode, when the shutter button 34 is pressed, a moving picture is recorded, and when the shutter button 34 is pressed again, recording of the moving picture stops.

3: Lens Position by Zoom Position and Focus Position

Figure 3:
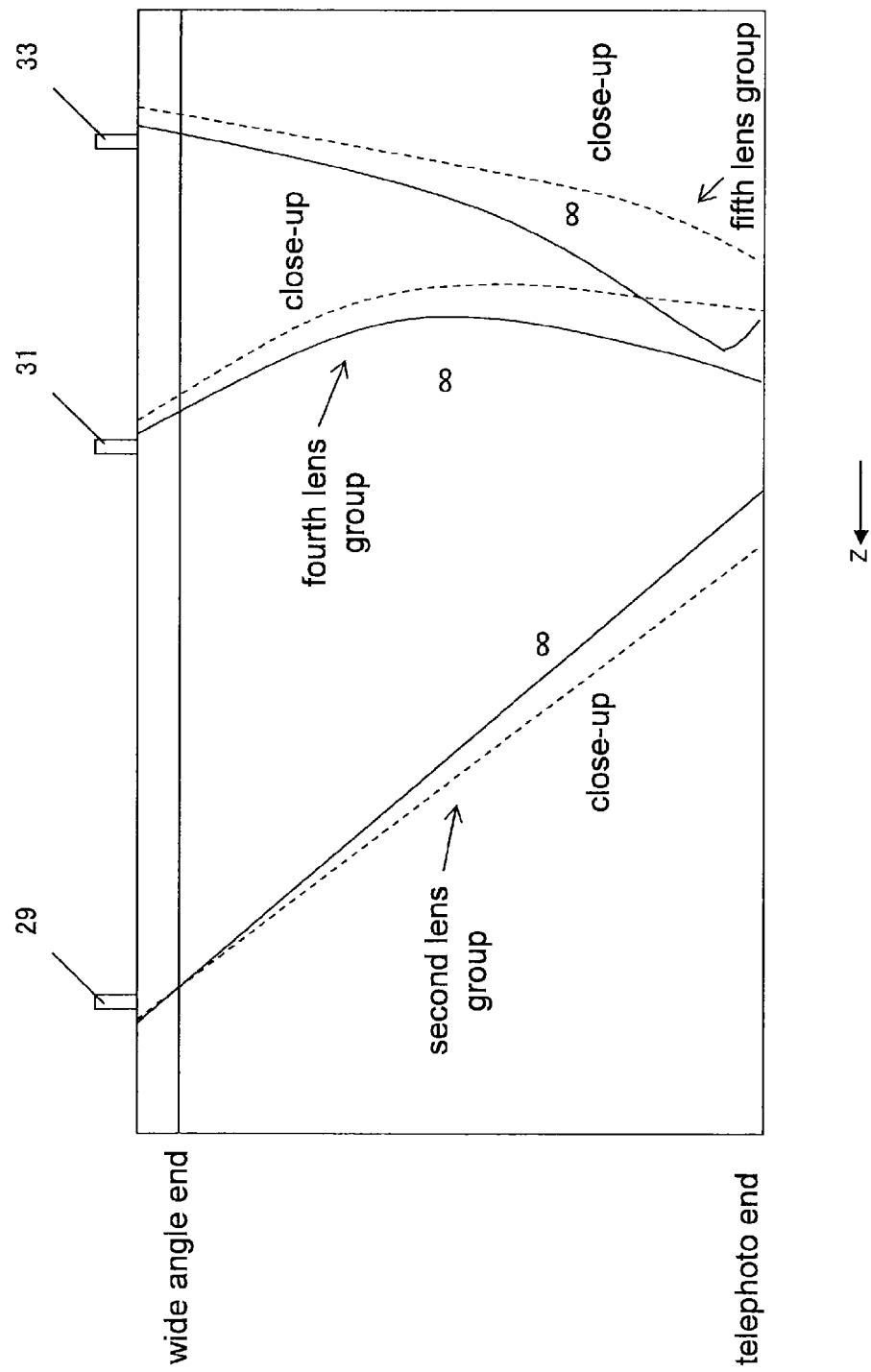
FIG. 3 is a diagram showing the positions of the various lens groups in zooming and focusing.

FIG. 3 is a diagram showing the positions of the second lens group 10, the fourth lens group 12, and the fifth lens group 13 in zooming and focusing. The horizontal axis shows the lens position, the left side is the subject direction, and the right side is the direction of the imaging sensor 19. The vertical axis shows the zoom position, the upper side is the wide angle side, and the lower side is the telephoto side. Therefore, when the second lens group 10, for example, zooms from the wide angle end to the telephoto end, the lens position moves from the subject side to the imaging element side. The focus position is indicated by a curve or straight line drawn from ∞ to close-up, and the second lens group 10, for example, moves from the imaging element side to the subject side when the focus position is changed from infinity to close-up at the telephoto end.

Figure 4:
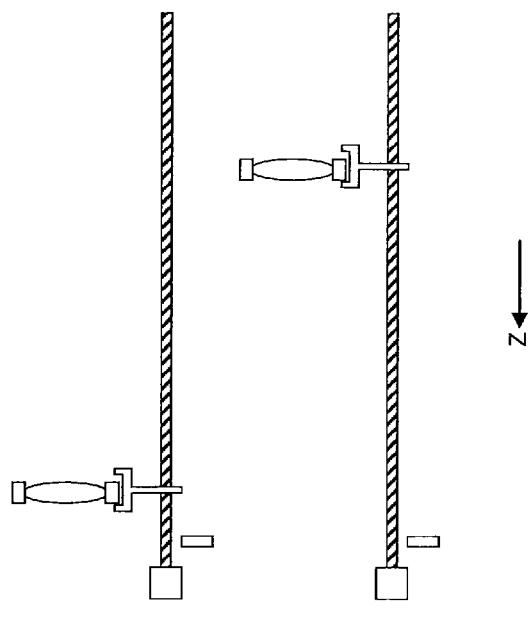
FIG. 4 consists of diagrams showing the position of a fourth lens group at the zoom position and the focus position.
Figure 4:
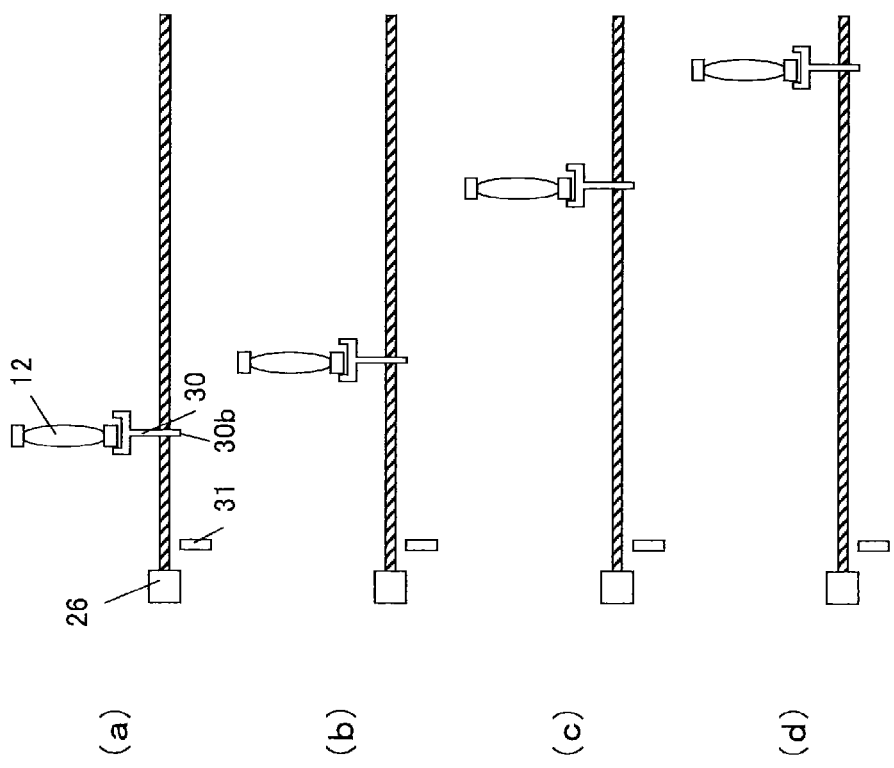

FIG. 4 consists of diagrams showing the position of the fourth lens group 12 in zooming focusing. The left side is the subject side, and the right side is the imaging sensor 19 side. FIG. 4a shows the position of the fourth lens group 12 when the zoom position is at the wide angle end focal distance position (hereinafter abbreviated as "W") and the focus position is at the infinity imaging distance (hereinafter abbreviated as "∞"). FIG. 4b shows the position of the fourth lens group 12 when the focus position at W is the close-up imaging distance (hereinafter abbreviated as "CU"). During focusing from ∞ to CU with the zoom position at W, the fourth lens group 12 moves from the subject side to the imaging sensor 19 side. FIG. 4c shows the lens position of the fourth lens group 12 when the zoom position is the neutral focal distance position (hereinafter abbreviated as "N") and the focus position is ∞, and FIG. 4d when the zoom position is N and the focus position is CU. FIG. 4e shows the lens position of the fourth lens group 12 when the zoom position is the telephoto end focal distance position (hereinafter abbreviated as "T") and the focus position is co, and FIG. 4f when the zoom position is T and the focus position is CU. In focusing from ∞ to CU when the zoom position is T, the fourth lens group 12 moves from the subject side to the imaging sensor 19 side.

The above indicates that when the focus position is ∞ and the zoom position goes from W, through N, to T, the lens position of the fourth lens group 12 first moves from the subject side to the imaging element side, and then moves back to the subject side.

4: Home Point Reset and Initial Position Movement

Figure 5:
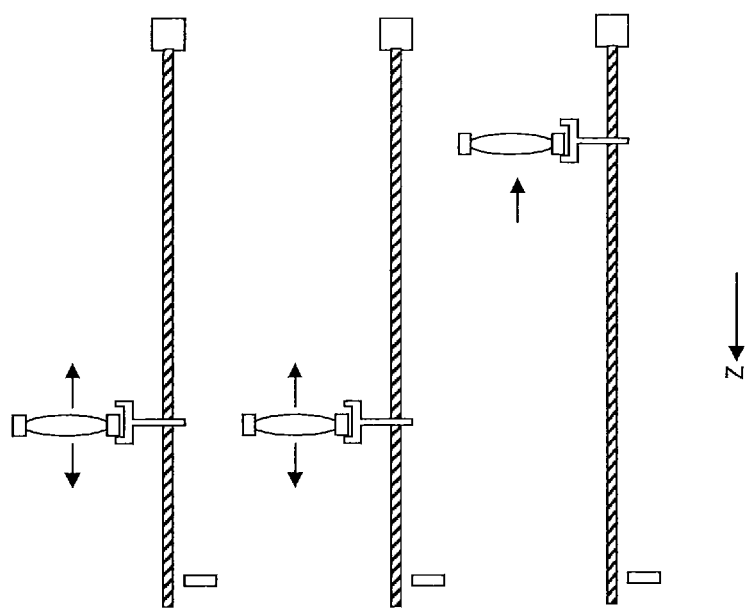
FIG. 5 consists of diagrams showing the initial operation of a second lens group.
Figure 5:
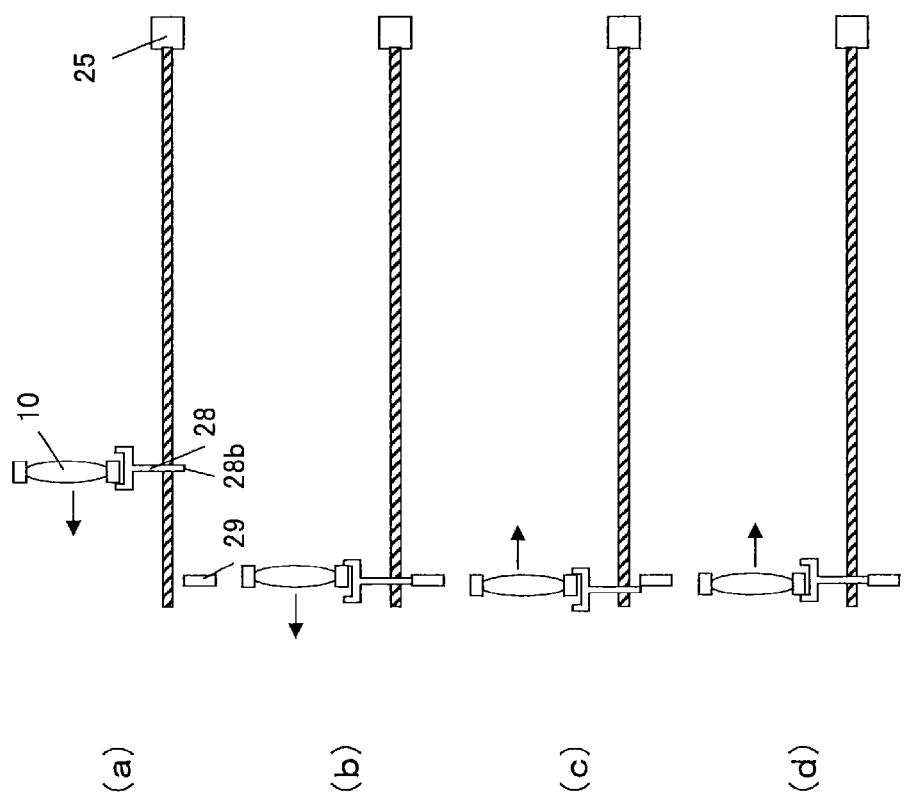

FIG. 5 consists of diagrams showing the initial operation of the second lens group.

FIG. 5a shows an example of the position of the second lens group 10 before power is turned on to the camera body. Since the body microprocessor 15 does not know the initial position of the second lens group 10 (where it is within its movable range), the second lens group 10 is driven in the direction of the second lens group photosensor 29, as shown in FIG. 5b. Then, as shown in FIG. 5c, even after the second lens group 10 has moved up to the second lens group photosensor 29, it is moved in the same direction by more than the mechanical gap (hysteresis) between the rack and the lens frame. After this, as shown in FIG. 5d, the movement direction is reversed, and the second lens group 10 is moved back to the position of the second lens group photosensor 29, and the home point detection operation is concluded.

Thus reversing the movement after first going a distance greater than the hysteresis allows the hysteresis to be taken up, and the body microprocessor 15 can ascertain the correct lens position. If this operation were not performed, in the reverse movement of the lens, the body microprocessor 15 would recognize a position that was shifted by the amount of hysteresis from the correct lens position.

After this, as shown in FIG. 5e, the lens group moves to the position where W is ∞, and the initial position movement is ended.

Subsequent operation of the lens group involves performing either zooming or focusing as desired by the user. Since the second lens group 10 is currently at the position where W is ∞, the lens position does not move when focusing is performed, as shown in FIG. 5f. If zooming is performed, the lens group moves from W to T. As shown in FIG. 5g, the second lens group 10 moves from the subject side to the imaging element side when zooming to T at the position where W is ∞.

With the second lens group 10, which is moved by zooming from a W of ∞ to T, but is not moved by focusing from a W of ∞ to CU, the home point detection position is disposed at a position that is shifted from the position of a W of ∞ in the opposite direction from the direction of initial drive after the initial position movement. Consequently, no hysteresis is produced initially after initial position movement, so no operation of taking up hysteresis occurs, and the operation can be carried out at higher speed.

The home point detection position is preferably close to the position upon completion of initial operation, because the initial operation will take less time. However, if it is too close, it is possible that lens or mechanism error could shift the ∞ position of W, so it is best to have an extra margin of about 10 to 500 μm.

Figure 6:
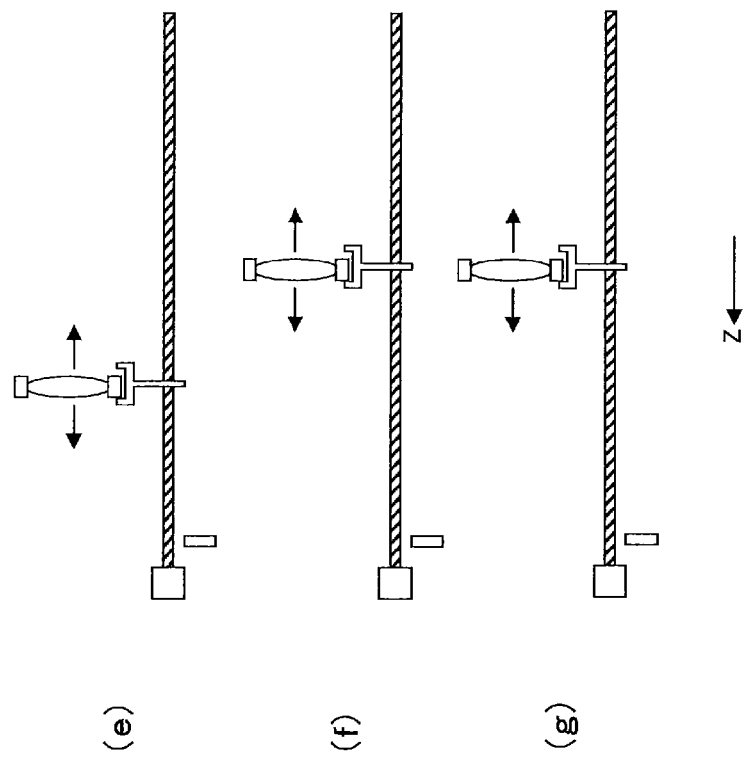
FIG. 6 consists of diagrams showing the initial operation of the fourth lens group.
Figure 6:
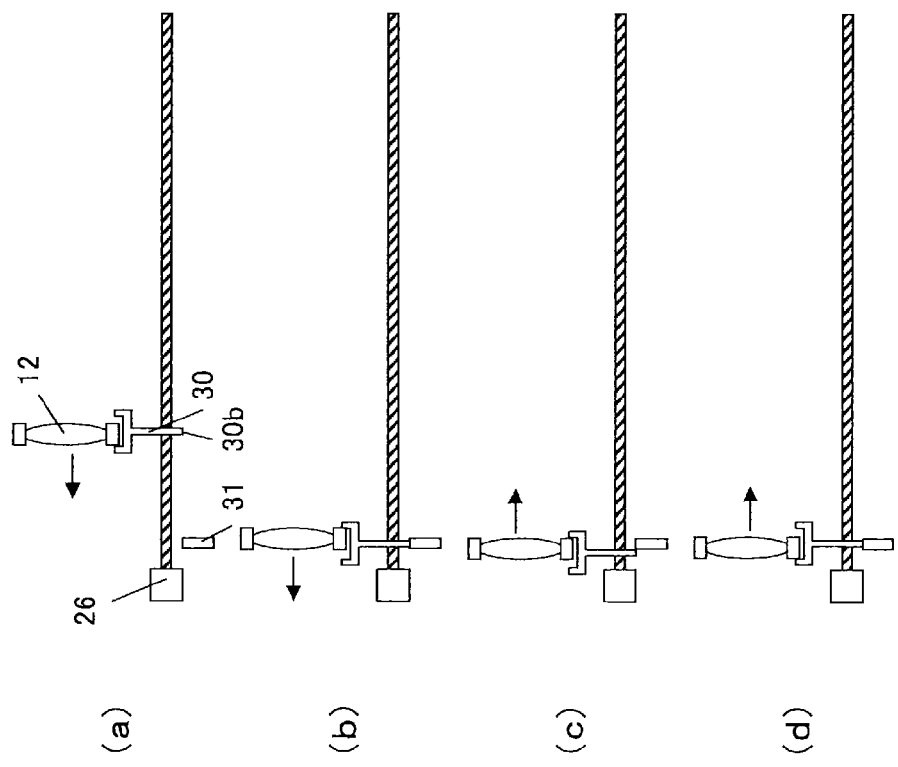

FIG. 6 consists of diagrams showing the initial operation of the fourth lens group 12.

FIG. 6a shows an example of the position of the fourth lens group 12 before the power to the camera body is turned on. Since the body microprocessor 15 does not know the initial position of the fourth lens group 12 (where it is within its movable range), the fourth lens group 12 is driven in the direction of the fourth lens group photosensor 31, as shown in FIG. 6b. Then, as shown in FIG. 6c, even after the fourth lens group 12 has moved up to the fourth lens group photosensor 31, it is moved in the same direction by more than the mechanical gap (hysteresis) between the rack and the lens frame. After this, as shown in FIG. 6d, the movement direction is reversed, and the fourth lens group 12 is moved back to the position of the fourth lens group photosensor 31, and the home point detection operation is concluded.

Thus reversing the movement after first going a distance greater than the hysteresis allows the hysteresis to be taken up, and the body microprocessor 15 can ascertain the correct lens position. If this operation were not performed, in the reverse movement of the lens, the body microprocessor 15 would recognize a position that was shifted by the amount of hysteresis from the correct lens position.

After this, as shown in FIG. 6e, the lens group moves to the position where W is ∞, and the initial position movement is ended.

Subsequent operation of the lens group involves performing either zooming or focusing as desired by the user. Since the fourth lens group 12 is currently at the position where W is ∞, it moves from ∞ toward CU when focusing is performed, as shown in FIG. 6f. The fourth lens group 12 moves from the subject side to the imaging element side during focusing from ∞ to CU at W. As shown in FIG. 6g, the fourth lens group 12 moves from the subject side to the imaging element side when zooming to T at the position where W is ∞.

With the fourth lens group 12, which moves in the same direction in focusing from a W of ∞ to CU and in zooming from a W of ∞ to T, the home point detection position is disposed at a position that is shifted from the position of a W of ∞ in the opposite direction from the direction in which the lens is driven during focusing and during zooming. Consequently, no hysteresis is produced initially after initial position movement, so no operation of taking up hysteresis occurs, and the operation can be carried out at higher speed.

The home point detection position is preferably close to the position upon completion of initial operation, because the initial operation will take less time. However, if it is too close, it is possible that lens or mechanism error could shift the ∞ position of W, so it is best to have an extra margin of about 10 to 500 μm.

Figure 7:
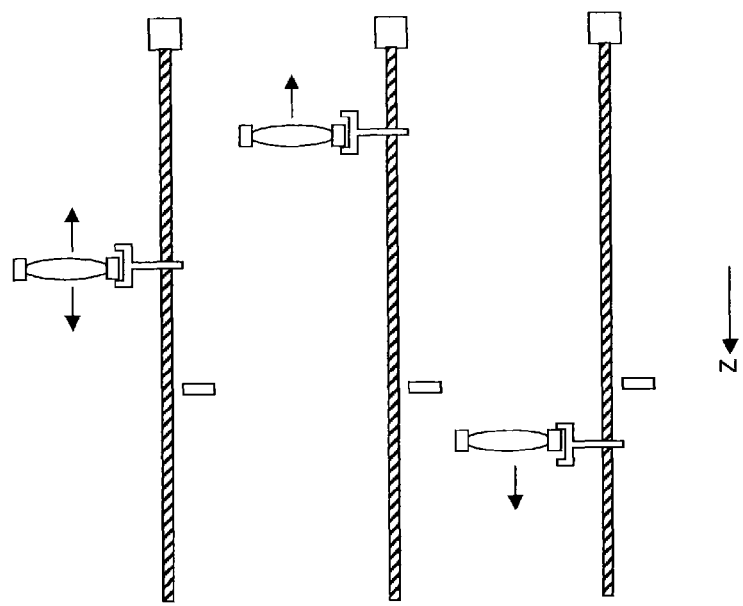
FIG. 7 consists of diagrams showing the initial operation of a fifth lens group.
Figure 7:
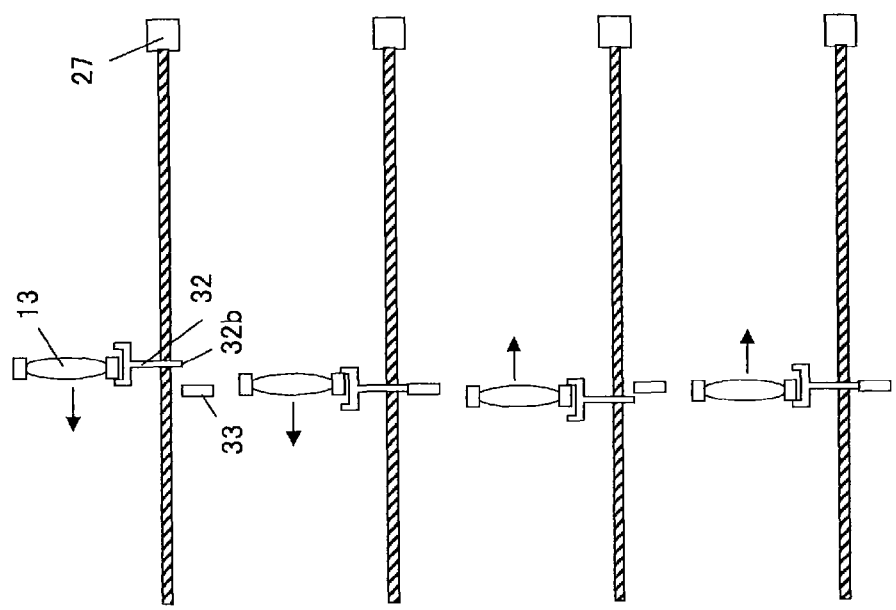

FIG. 7 consists of diagrams showing the initial operation of the fifth lens group 13.

FIG. 7a shows an example of the position of the fifth lens group 13 before the power to the camera body is turned on. Since the body microprocessor 15 does not know the initial position of the fifth lens group 13 (where it is within its movable range), the fifth lens group 13 is driven in the direction of the fifth lens group photosensor 33, as shown in FIG. 7b. Then, as shown in FIG. 7c, even after the fifth lens group 13 has moved up to the fifth lens group photosensor 33, it is moved in the same direction by more than the mechanical gap (hysteresis) between the rack and the lens frame. After this, as shown in FIG. 7d, the movement direction is reversed, and the fifth lens group 13 is moved back to the position of the fifth lens group photosensor 33, and the home point detection operation is concluded.

Thus reversing the movement after first going a distance greater than the hysteresis allows the hysteresis to be taken up, and the body microprocessor 15 can ascertain the correct lens position. If this operation were not performed, in the reverse movement of the lens, the body microprocessor 15 would recognize a position that was shifted by the amount of hysteresis from the correct lens position.

After this, as shown in FIG. 6e, the lens group moves to the position where W is ∞, and the initial position movement is ended.

Subsequent operation of the lens group involves performing either zooming or focusing as desired by the user. Since the fifth lens group 13 is currently at the position where W is ∞, it moves from ∞ toward CU when focusing is performed, as shown in FIG. 7f. The fifth lens group 13 moves from the subject side to the imaging element side during focusing from ∞ to CU at W. As shown in FIG. 7g, the fifth lens group 13 moves from the subject side to the imaging element side when zooming to T at the position where W is ∞.

With the fifth lens group 13, which moves in opposite directions in focusing from a W of ∞ to CU and in zooming from a W of ∞ to T, the home point detection position is disposed at a position that is shifted from the position of a W of ∞ in the opposite direction from the direction in which the lens is driven during focusing. Consequently, no hysteresis is produced during focusing after initial position movement, so no operation of taking up hysteresis occurs, and the operation can be carried out at higher speed. Some hysteresis remains during zooming, but zooming differs from focusing in that the change in field angle with respect to the lens position is smaller, and the user sets the field angle to the desired position while looking at the image display device, so there is no problem even if the actual field angle deviates slightly from the field angle recognized by the lens controller.

The home point detection position is preferably close to the position upon completion of initial operation, because the initial operation will take less time. However, if it is too close, it is possible that lens or mechanism error could shift the ∞ position of W, so it is best to have an extra margin of about 10 to 500 μm.

As discussed above, the operation after initial position movement can be made faster by disposing the home point positions of the three lens groups 10, 12, and 13 at the desired positions.

Figure 8:
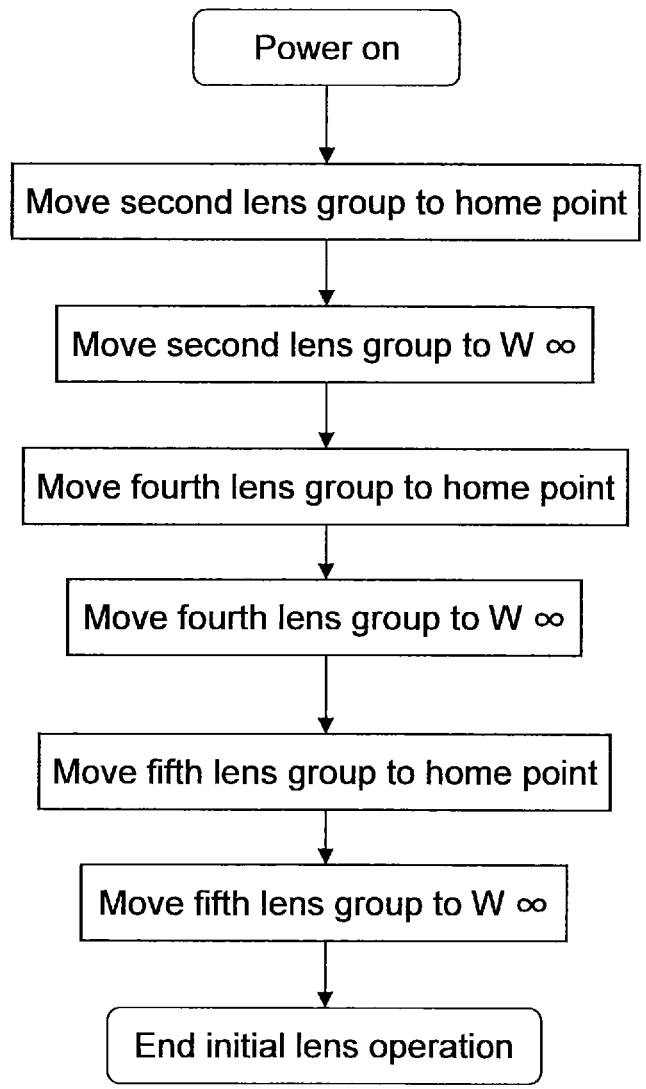
FIG. 8 is a flowchart showing an example of initial operation.

5: Operating Sequence During Home Point Resetting and During Initial Position Movement FIG. 8 is a flowchart showing an example of initial operation. After the power is turned on, it is preferable if home point resetting and initial position movement are performed for the second lens group 10, home point resetting and initial position movement are performed for the fourth lens group 12, and home point resetting and initial position movement are performed for the fifth lens group 13, and if the overall initial operation is concluded. Consequently, as shown in FIG. 3, even if the movable range of the fourth lens group 12 and the movable range of the fifth lens group 13 interfere on the optical axis 5, the two lens groups can be prevented from colliding.

Figure 9:
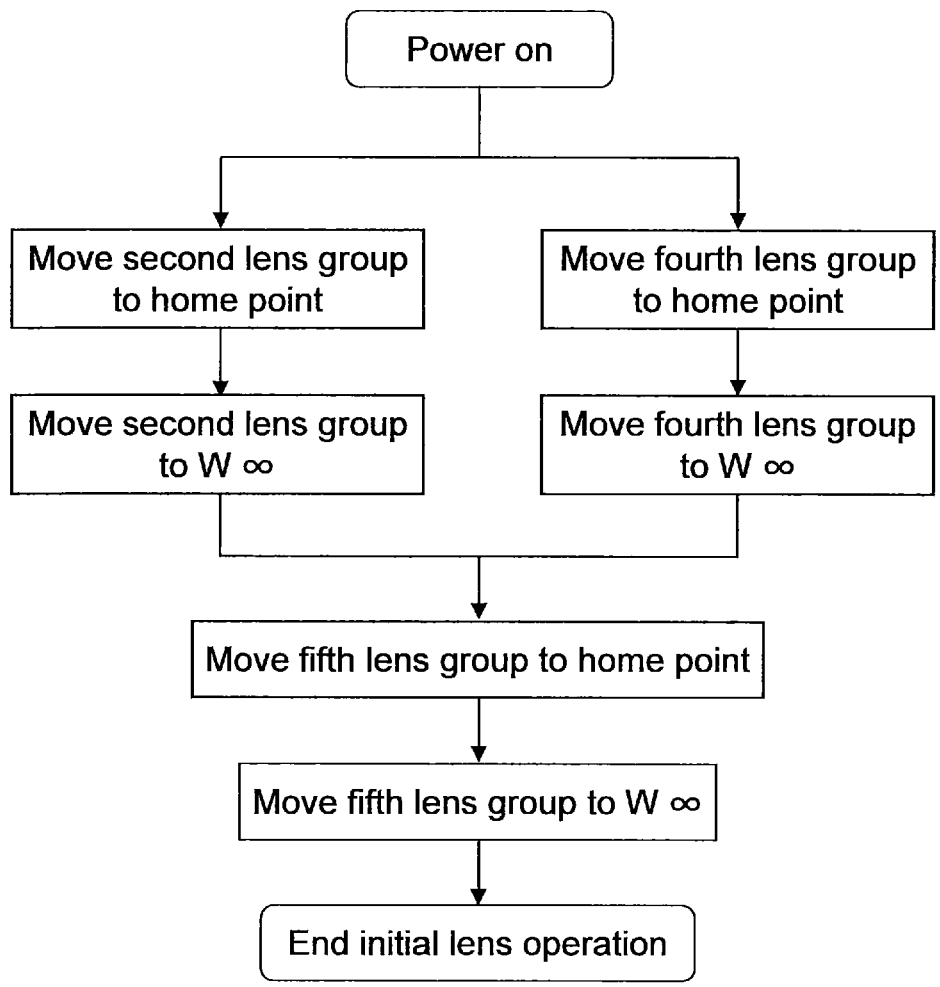
FIG. 9 is a flowchart showing an example of initial operation at high speed.

FIG. 9 is a flowchart showing an example of initial operation at high speed. After home point resetting and initial position movement have been performed simultaneously for either the fourth lens group 12 or the fifth lens group 13 (with which interference could happen) and for the second lens group 10 (with which interference could not happen), home point resetting and initial position movement are performed for other lens groups with which interference could happen, which increases the speed.

Figure 10:
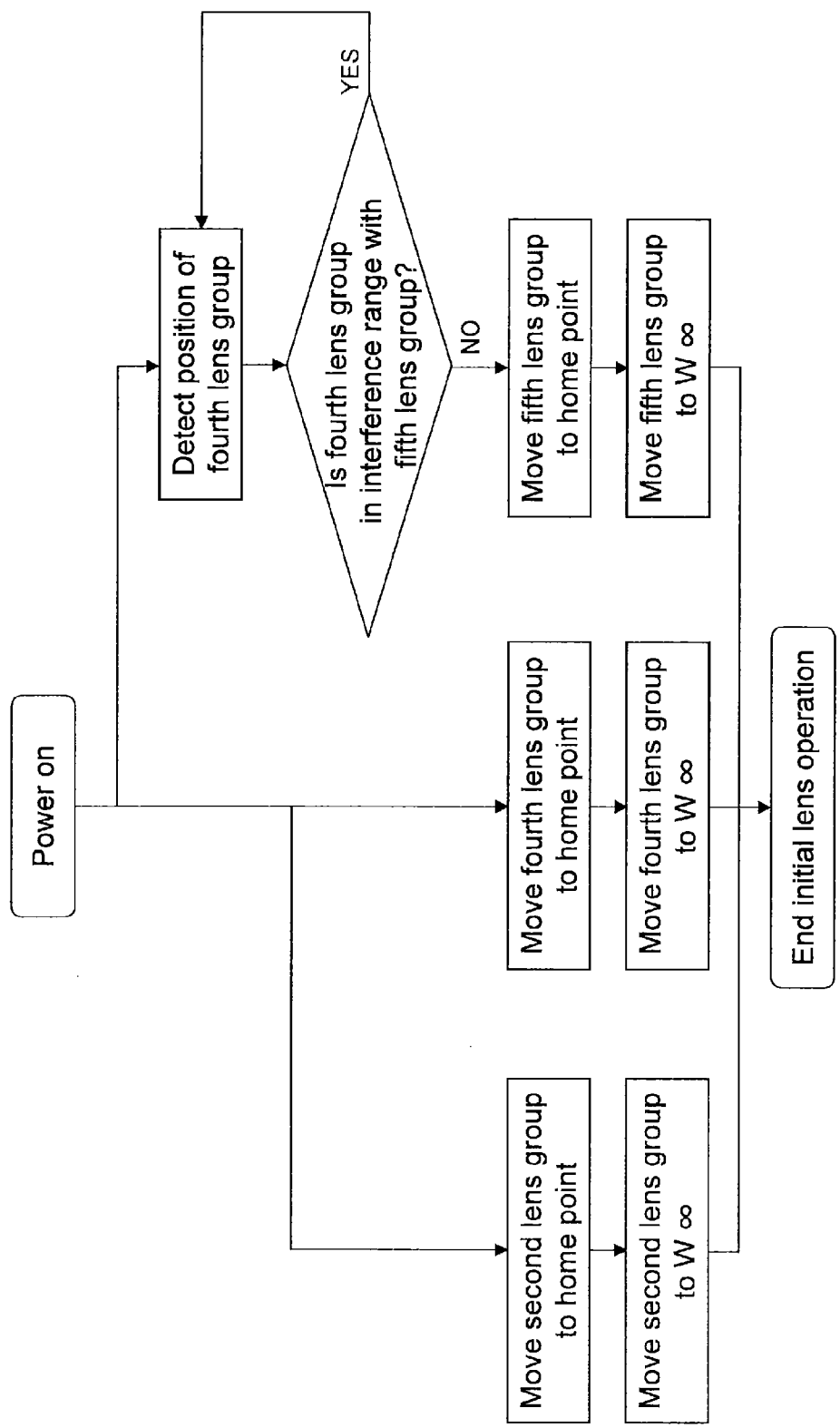
FIG. 10 is a flowchart showing an example of initial operation at even higher speed.

FIG. 10 is a flowchart showing an example of initial operation at even higher speed. A sensor is provided for determining whether or not a lens group is within a range of interference, and after a lens group with which interference could happen has gone past the range of interference, all of the lens groups are simultaneously driven, which allows the home point resetting and initial position movement to be faster.

Figure 11:
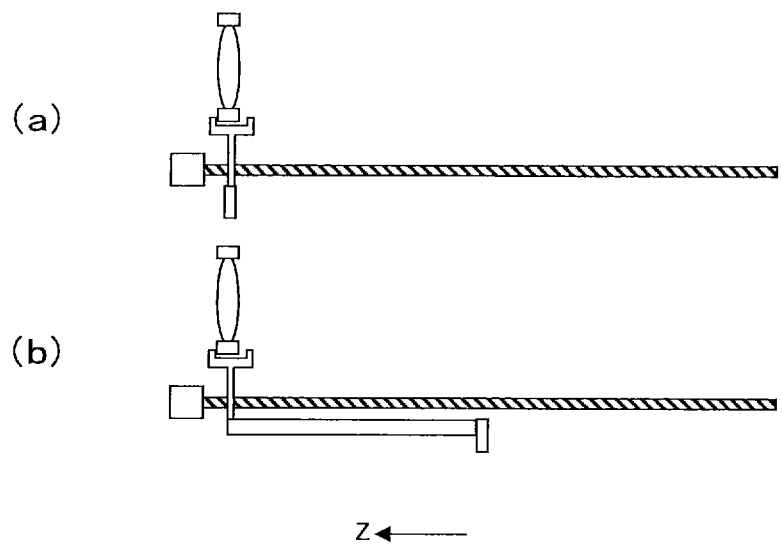
FIG. 11 is another embodiment of the layout of an interference detection photosensor.

FIG. 11 is another embodiment of the layout of an interference detection photosensor. An interference detecting protrusion of the same length as that of the range over which interference occurs is displayed on the lens group rack separately from the home point detecting protrusion. The interference detecting protrusion and an interference detecting sensor are disposed so that when a lens group is located at the subject side end of the range over which interference occurs, the interference detecting sensor becomes the subject side end of the interference detecting protrusion. The interference detecting sensor is connected to the body microprocessor 15. With this configuration, when a lens group is in an interference position, the interference detecting protrusion is inside the interference detecting sensor, so the body microprocessor 15 can tell whether or not the lens group is in an interference position.

Figure 12:
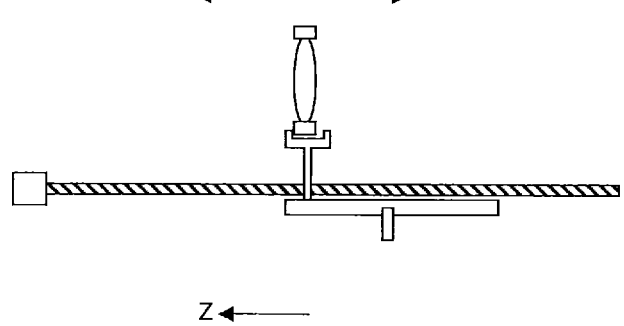
FIG. 12 is another embodiment of the layout of a photosensor.

In this embodiment, the lens position and the home point position were described as being the same place, but another embodiment of the photosensor layout is shown in FIG. 12. A lens group protrusion has a shape that extends in the optical axis direction. With this configuration, the home point detecting sensor may be disposed at a place that is shifted away from the lens group.

Other Embodiments

Embodiments of the present invention are not limited to the embodiment given above, and various changes and modifications are possible without departing from the gist of the present invention. Also, the embodiment given above is basically just a favorable example, and is not intended to limit the present invention, its applications, or the scope of its application.

(1) In the above embodiment, the digital camera was able to capture both still and moving pictures, but may instead be able to capture only still pictures or only moving pictures.

(2) In the above embodiment, the digital camera may be, for example, a digital still camera, a digital video camera, a portable telephone equipped with a camera, or a PDA equipped with a camera.

(3) The above-mentioned digital camera 1 does not have a quick-return mirror, but a quick-return mirror may be installed as in a conventional single lens reflex camera.

(4) The configuration of the optical system 4 is not limited to that given in the above embodiment. For example, the third lens group 11 may be made up of a plurality of lenses, and there may be a sixth lens group. Also, the configuration may include three or more lens groups during at least zooming and focusing.

(5) In the above embodiment, the exposure time of the imaging sensor 19 was controlled by actuating the shutter unit 19*a*, but the exposure time of the imaging sensor 19 may instead be controlled by an electronic shutter.

(6) The second lens group zoom focus motor 25, the fourth lens group zoom focus motor 26, and the fifth lens group zoom focus motor 27 may be some other actuator besides a stepping motor. For example, this actuator may be an electromagnetic motor, a voice coil motor, a vibrating actuator that makes use of a piezoelectric element, or the like.

(7) The zoom focus drive controller 8 may control the second lens group zoom focus motor 25 so as to drive just the second lens group 10 back and forth in the optical axis 5 direction during wobbling. Also, the zoom focus drive controller 8 may control the fourth lens group zoom focus motor 26 so as to drive just the fourth lens group 12 back and forth in the optical axis 5 direction during wobbling. Also, the zoom focus drive controller 8 may control the fifth lens group zoom focus motor 27 so as to drive just the fifth lens group 13 back and forth in the optical axis 5 direction during wobbling.

(8) The aperture drive motor may be another actuator besides a stepping motor, for example, this actuator may be an electromagnetic motor, a voice coil motor, a vibrating actuator that makes use of a piezoelectric element, or the like.

(9) An integrated lens type of camera was described, but the same effect can be obtained with an interchangeable lens camera.

(10) In the above embodiment, the home point detector was described as being a photointerrupter, but may instead be some other position sensor. More specifically, it may be a position sensor that makes use of an optical, electromagnetic, physical, or magnetic effect.

(11) In the above embodiment, the optical system 4 comprised three zoom focus lens groups, namely, the second lens group 10, the fourth lens group 12, and the fifth lens group 13, but this is not the only option. The optical system 4 may comprise just two zoom focus lens groups, or may comprise four or more zoom focus lens groups.

Industrial Applicability

The present invention is favorable for the lens barrel of an imaging device or the like.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel and the imaging device equipped with the lens barrel. Accordingly, these terms, as utilized to describe the technology disclosed herein should be interpreted relative to the lens barrel and the imaging device equipped with the lens barrel.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A lens barrel comprising:
a first zoom/focus lens group and a second zoom/focus lens group configured to respectively vary a focal distance and an imaging distance by moving in an optical axis direction;
a first actuator configured to drive the first zoom/focus lens group;
a second actuator configured to drive the second zoom/focus lens group;
wherein the first actuator and the second actuator are not mechanically coupled to each other; and
the first zoom/focus lens group and the second zoom/focus lens group are configured to change their positions in the optical axis direction in both zooming and focusing.

2. The lens barrel according to claim 1 comprising
a first home point detector configured to detect whether or not the first zoom/focus lens group is disposed at a first home point position, wherein
if the first zoom/focus lens group is not moved according to a change in the imaging distance when located at a wide angle end focal distance position, the first home point position is outside a range of a wide angle end focal distance position to a telephoto end focal distance position and is located near the wide angle end focal distance position.

3. The lens barrel according to claim 1, further comprising
a first home point detector configured to detect whether the first zoom/focus lens group is disposed at a first home point position; and
if a movement of the first zoom/focus lens group from the wide angle end focal distance position to the telephoto end focal distance position is in a same direction as movement of the first zoom/focus lens group from the infinity imaging distance position to a close-up imaging distance position when the first zoom/focus lens group is located at an infinity imaging distance position at the wide angle end focal distance position, the first home point position is outside a range of the wide angle end focal distance position to the telephoto end focal distance position of the first zoom/focus lens group and is located near the wide angle end focal distance position, and the first home point position is outside a range of the infinity imaging distance position to the close-up imaging distance position and is located near the infinity imaging distance position.

4. The lens barrel according to claim 3, wherein
the first zoom/focus lens group moves to the infinity imaging distance position at the wide angle end focal distance position after the first home point detector has detected that the first zoom/focus lens group is disposed at the first home point position.

5. The lens barrel according to claim 3 further comprising
a second home point detector configured to detect whether or not the second zoom/focus lens group is disposed at a second home point position after the first home point detector has detected that the first zoom/focus lens group is disposed at the first home point position.

6. The lens barrel according to claim 1, further comprising
a first home point detector configured to detect whether the first zoom/focus lens group is disposed at a first home point position; and
if a movement of the first zoom/focus lens group from the wide angle end focal distance position to the telephoto end focal distance position is in a different direction from movement of the first zoom/focus lens group from the infinity imaging distance position to a close-up imaging distance position when the first zoom/focus lens group is located at an infinity imaging distance position at the wide angle end focal distance position, the first home point position is outside a range of the infinity imaging distance position to the close-up imaging distance position of the first zoom/focus lens group and is located nearer to the infinity imaging distance position than the close-up imaging distance position.

7. The lens barrel according to claim 6, wherein
the first zoom/focus lens group moves to the infinity imaging distance position at the wide angle end focal distance position after the first home point detector has detected that the first zoom/focus lens group is disposed at the first home point position.

8. The lens barrel according to claim 6, wherein
a second home point detector configure to detect whether or not the second zoom/focus lens group is disposed at a second home point position after the first home point detector has detected that the first zoom/focus lens group is disposed at the first home point position.

9. The lens barrel according to claim 1, wherein
the first zoom/focus lens group moves to the infinity imaging distance position at the wide angle end focal distance position after the first home point detector has detected that the first zoom/focus lens group is disposed at the first home point position.

10. The lens barrel according to claim 1 comprising
a second home point detector configured to detect whether or not the second zoom/focus lens group is disposed at a second home point position after the first home point detector has detected that the first zoom/focus lens group is disposed at the first home point position.

11. The lens barrel according to claim 10 comprising:
a third zoom/focus lens group, a moveable range of the third zoom/focus lens group in an optical axis direction configured to interfere with the first zoom/focus lens group and not to interfere with the second zoom/focus lens group; and a third home point detector configured to detect whether or not the third zoom/focus lens group is disposed at a third home point position, wherein the third home point detector is configured to start detecting simultaneously with the first home point detector, and the second home point detector is configured to start detecting after completion of detection by the first home point detector and the third home point detector.

12. The lens barrel according to claim 11 comprising an interference position detector is configured to detect whether or not the first zoom/focus lens group and the third zoom/focus lens group are within a range of interference, wherein each of the first home point detector, the second home point detector and the third home point detectors are configured to start detecting after the interference position detector has detected that the first zoom/focus lens group and the third zoom/focus lens group are not within a range of interference.

13. An imaging device capable of outputting an optical image of an object as an electrical image signal comprising:
The lens barrel according to claim 1; and
an imaging element configured to convert an optical image formed by said lens barrel into an electrical image signal.

14. A camera configured to convert an optical image formed by the lens barrel into an electrical image signal, and display and/or storage of the converted image signal, the camera comprising:
an imaging device including the lens barrel according to claim 1 and an imaging element, the imaging element configured to convert an optical image formed by the lens barrel into an electrical image signal.

* * * * *